United States Patent [19]
Musselman et al.

[11] Patent Number: 5,234,266
[45] Date of Patent: Aug. 10, 1993

[54] TRACTION STUD

[75] Inventors: James R. Musselman; Brian D. Musselman, both of Hope, Mich.

[73] Assignee: International Engineering & Manufacturing Inc., Hope, Mich.

[21] Appl. No.: 814,697

[22] Filed: Dec. 30, 1991

[51] Int. Cl.$^5$ .............................................. B62D 55/26
[52] U.S. Cl. ................................ 305/54; 305/35 EB
[58] Field of Search .................... 305/35 R, 35 E, 39, 305/51, 53, 54, 55

[56] References Cited

U.S. PATENT DOCUMENTS

| | | | |
|---|---|---|---|
| 3,838,894 | 10/1974 | Reedy | 305/54 X |
| 4,059,315 | 11/1977 | Jolliffe et al. | 305/35 EB |
| 4,218,101 | 8/1980 | Thompson | 305/54 X |
| 4,758,055 | 7/1988 | Anderson | 305/35 EB |

Primary Examiner—Russell D. Stormer
Attorney, Agent, or Firm—John J. Swartz

[57] ABSTRACT

A stud for snowmobiles and the like including an elongate shank and an integral, transversely disposed head. The shank may be mounted in an aperture provided in an endless snowmobile drive track with the head engaging one side of the snowmobile track. A fastener is detachably mounted on the shank for engaging the opposite side of the track. The head includes a concavo-convex flange having a concave inner surface for radially inwardly urging a portion of the track which is adjacent the shank and which is axially displaced when the head is mounted on the track. The head also includes an axially outer surface having an axially inwardly extending, central recess having a radius of curvature which matches the radius of the snowmobile track drive wheels.

40 Claims, 3 Drawing Sheets

TRACTION STUD

BACKGROUND OF THE INVENTION

1. Field of the Invention

This invention relates to a stud for snowmobiles and the like and more particularly to a stud having a shank integrally mounting a new and improved head thereon.

2. Description of the Prior Art and Objects

Studs for snowmobile tracks have been provided heretofore such as that illustrated in U.S. Pat. No. 4,758,055 issued to Jay Anderson on Jul. 19, 1988. Such studs include shanks which pass through apertures in a resilient snowmobile belt and planar heads which, when mounted on the belt, so as to be tightly clamped thereto, radially outwardly displace a portion of the resilient belt to provide a bulge adjacent the leading and trailing edges of the head. The endless track is typically mounted for movement in endless path about a snowmobile drive wheel and an idler wheel. As the track negotiates the wheels, the bulges, when negotiating the wheels tend to induce vibration. Accordingly, it is an object of the present invention to provide a new and novel stud which will reduce vibration in a snowmobile track.

It is another object of the present invention to provide a new and novel stud which will reduce the bulging which previously occurred in snowmobile drive belts adjacent the leading and trailing edges of the head of the stud when the stud is installed in the track.

One type of stud is mounted to a snowmobile track with a nut which is threadedly mounted thereon. As the nut is threaded onto the stud, the head of the stud is axially moved in a direction toward the inside surface of the track until it is embedded in the resilient track material to a depth that the axial end surface of the stud head is flush with the inside track surface. When the stud is installed, the head will axially displace a portion of the resilient track material. The studs are more rigid if a portion of the resilient track, which has been axially displaced by the head along the shank of the stud, is also radially inwardly displaced toward the shank. Accordingly, it is another object of the present invention to provide a snowmobile stud having a cup shaped perimetrically extending flange for radially inwardly urging a portion of the track adjacent the shank radially inwardly towards the shank.

Yet another object of the present invention is to provide a stud of the type described including a shank having an elongate axis and an integral transverse head having a concave-axially inner surface for radially inwardly urging a portion of the track adjacent the stud shank when the stud is mounted on the track.

It is another object of the present invention to provide a stud for a snowmobile track which, for a track of a predetermined thickness, will increase the total bearing surface area between the track and the shank of the stud.

Another object of the present invention is to provide a stud including a head which will displace a portion of the track material along the length of the shank to provide increased stability to the stud.

As the flat planar head of the prior art stud engages and negotiates the snowmobile drive wheels, the contour of flat head surface will not match the arcuate contour of the snowmobile wheels and thus substantial forces are introduced to the head tending to bend and break the stud head. Also, the flat or planar stud head, as it negotiates the snowmobile drive wheels, tends to push or lift the stud and the track away from the wheels. This increases the tension on the track and tends to stretch the track. Such stretching is undesirable and detracts from track life. Accordingly, it is another object of the present invention to provide a new and novel stud which will improve snowmobile track life.

Yet another object of the present invention is to provide a new and novel snowmobile stud which will decrease the stretching of the snowmobile track.

Still another object of the present invention is to provide a snowmobile stud having a head with a curved wheel engaging axial end surface.

Yet another object of the present invention is to provide a snowmobile stud including an integral mounting head including a snowmobile wheel engaging arcuate portion having a radius of curvature equal to the radius of the snowmobile drive wheel.

Typically, snowmobiles include a suspension system having nylon strips bearing against the inside or upper surface of the lower run of an endless snowmobile belt. Some of the stud heads will bear against the undersides of these nylon strips as the belt moves in its endless path of travel. As the prior art planar stud head negotiates the undersides of the nylon strips, substantially the entire axial end surface of the planar head frictionally engages and wears on the undersides of the confronting strip. In snowmobile racing machines, the energy dissipation resulting from this friction can be significant. Accordingly, it is another object of the present invention to provide a new and improved snowmobile ice stud which will reduce the friction between the endlessly moving snowmobile ice stud and the snow machine.

Another object of the present invention is to provide a snowmobile ice stud which will decrease the energy required to propel a snowmobile.

Yet another object of the present invention is to provide a stud for snowmobiles and the like having a head with a central portion, a radially outer terminal flange portion, an intermediate portion integrally formed with and disposed between the central portion and the terminal flange portion with the central portion and terminal flange portions being axially inwardly recessed relative to the intermediate portion.

Snowmobile racers sometimes introduce lubricant between the track and the nylon or plastic snow machine suspension runners or nylon strips to reduce friction therebetween. It has been found difficult to uniformally disperse lubricant along the bearing surfaces with which the track engages and thus this tends to introduce track wear and increase the energy required to propel the snowmobile. It has been found, according to the present invention, that by providing a central recess in the axially outer, centrally disposed surface of the head of a snowmobile stud, that the recess will form a lubricant receiving cavity for receiving lubricant and dispersing lubricant along the length of the snowmobile wear strip. Accordingly, it is another object of the present invention to provide a snowmobile ice stud which includes a head having a central recess in the outer surface thereof for receiving and distributing lubricant along a portion of a snowmobile wear surface.

Another object of the present invention is to provide the combination of a snowmobile track and a new and novel stud of the type disclosed herein.

Other objects and advantages of the present invention will become apparent to those of ordinary skill in the art as the description thereof proceeds.

SUMMARY OF THE INVENTION

A stud for mounting on an endless snowmobile track or the like having inside and outside surfaces including an elongate shank for extending through the track, a mounting head integral with the shank and adapted to engage the inside surface of the track; the head including an axially outer surface having an axially inwardly recessed, central portion forming a central cavity, and mechanism detachably coupled to the shank for releaseably urging the head toward the snowmobile track.

DESCRIPTION OF THE DRAWINGS

The invention may be more readily understood by referring to the accompanying drawings, in which.

DESCRIPTION OF THE PREFERRED EMBODIMENT

Figure 1:
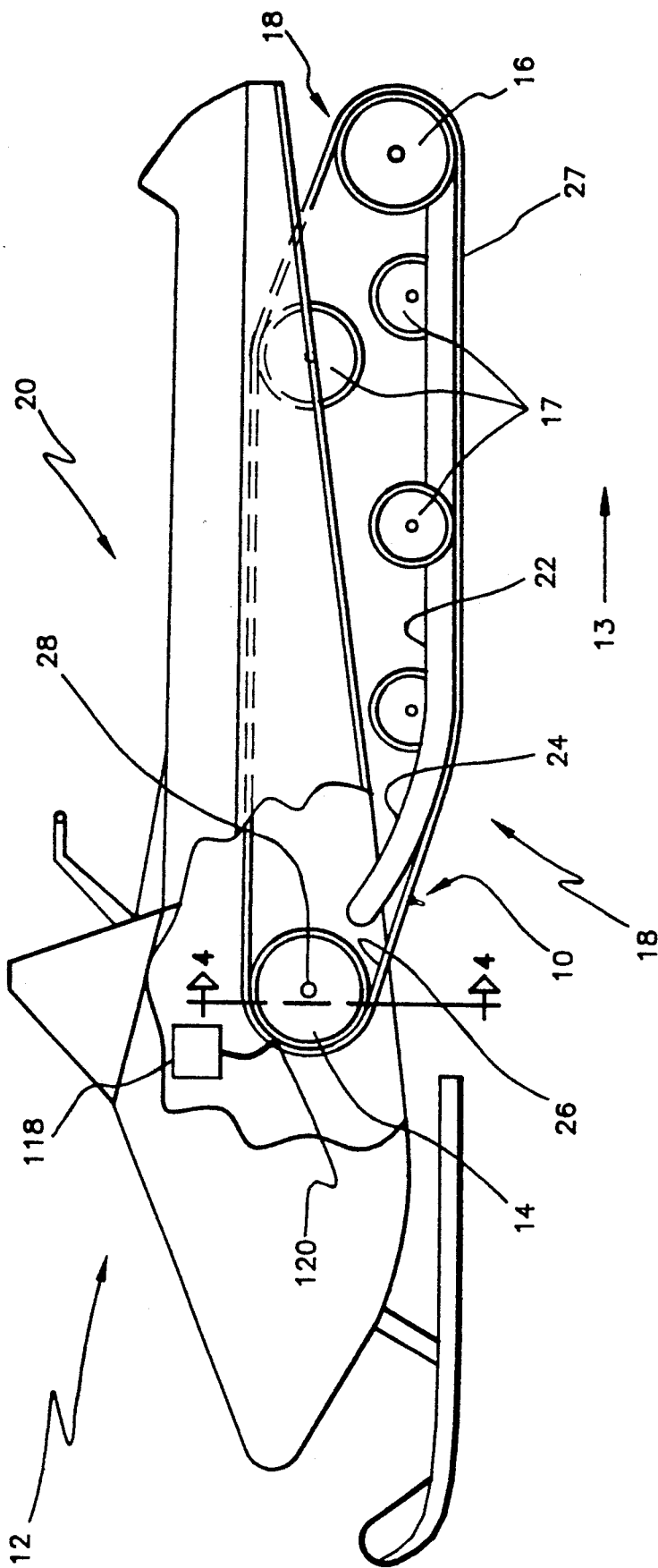
FIG. 1 is a side elevational view of a snowmobile incorporating apparatus constructed according to the present invention.
Figure 2:
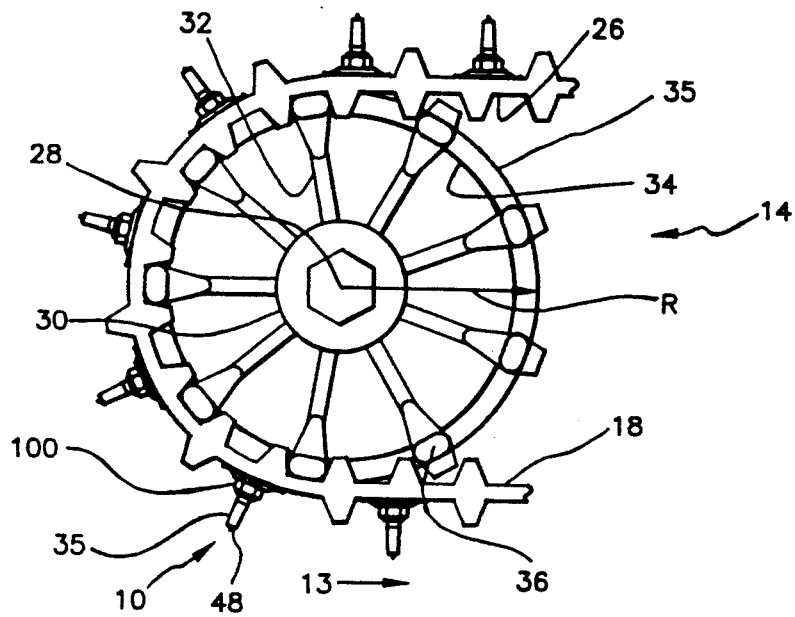
FIG. 2 is an enlarged side elevational view illustrating a front drive wheel and snowmobile belt mounted thereon.

A stud, generally designated 10, is particularly adapted for use with a snowmobile machine, generally designated 12, which includes a forward, rotatable drive wheel 14, a rearward, rotatable idler wheel 16 and a plurality of smaller diameter intermediate idler wheels 17. An endless, resilient snowmobile track, generally designated 18 is trained around the wheels 14, 16 and 17 for movement in an endless path of travel, illustrated by the reference character 13. A snowmobile body, generally designated 20, is mounted on a suspension system, generally designated 22, including wear strips 24 which glide along the inner surface 26 of the lower run 27 of the track 18. Such wear strips may suitably comprise nylon or other suitable plastic material. The front wheel 14 is driveably coupled to a gasoline engine (not shown) via suitable drive belts or chains to rotatably drive the wheel 14 about its axis 28.

Each wheel 14 and 16 includes a central hub 30 mounting a plurality of radial spokes 32 which in turn mount a radially outer ring 34 having a circumferentially outer surface 35 against which the inside surface 26 of the track 18 rides as it negotiates the wheels 14 and 16.

The ring 34 on the front drive wheel 14 includes integral, axially extending cross bars 36 which are engaged by axially spaced sets of longitudinally spaced lugs 38 projecting inwardly from the inside surface 26 of the track 18. The outer drive surface 35 of the wheel ring 34 has a radius R about the rotational axis 28. Additional laterally inwardly disposed rows of spaced apart lugs 37 guide the wear strips 24 to help provide lateral stability to the track 18.

The track 18 includes a plurality of spaced apart openings 40 therethrough which receive the studs 10.

Each stud 10 includes an elongate shank, generally designated 42, having a longitudinal axis 31. The shank 42 includes a right circular cylindrical mid-portion 33 and a tapered end portion 35 having a terminal outer end 46 which includes an elongate recess 48 receiving a hardened insert 50 having a conical ice penetrating end 54 terminating in an ice penetrating point 56.

The insert 50 may suitably comprise a material harder than the material comprising the shank 42 such as hardened carbide.

The shank 42 includes an enlarged diameter end portion 58 coupled to mid-portion 33 to provide a stop or shoulder 60 for a purpose to be described more particularly hereinafter. The enlarged shank end 58 has a diameter D compared to the reduced diameter d of the cylindrical portion of the shank.

Integrally formed with the enlarged shank end portion 58 is a transversely extending head, generally designated 62, including in its axially inner surface 63, a centrally disposed axially outwardly extending, uniformly curved arcuate recess 64 and a transversely extending, annular, concavo-convex flange 66 having an annular, concave axially outer surface 68 and a convex, interior surface 70. As illustrated, the head 62 forms an annular, axially outwardly opening belt receiving trough which is radially outwardly of the shank 42. The trough includes radially inner and outer annular trough sidewalls defined by the radially outer spaced portions 68a and 68b, respectively, of the axially outer surface 68. The surfaces 68a and 68b radially converge toward each other in an axially inward direction to provide an annularly extending, axially outer, track receiving concave surface 68 which engages the inner surface 18 of the snowmobile belt. The central recess 64 includes an arcuate, partially inverted spherical surface 72 having a radius of curvature r such that all points of the surface 72 are an equal distance R from a predetermined point. The radius of curvature r is equal to the radius R of the wheel 14.

Figure 3:
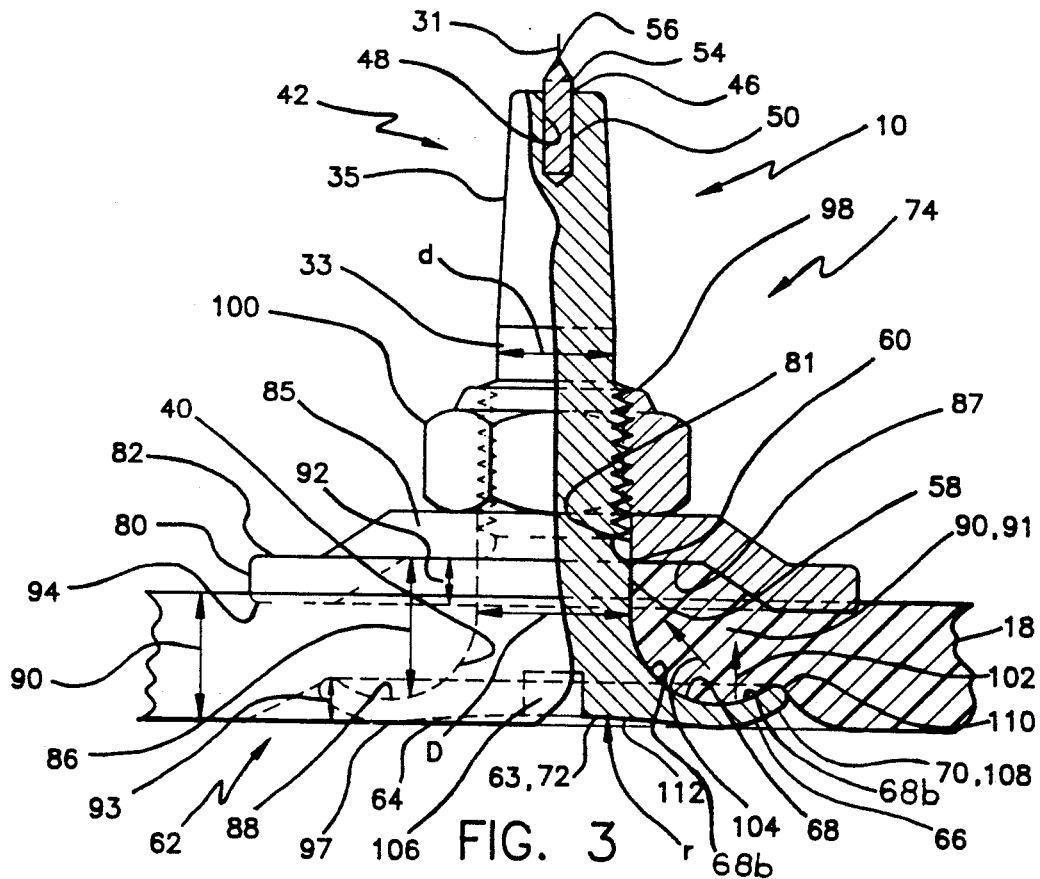
FIG. 3 is a further enlarged, partially sectional side view more particularly illustrating the stud, constructed according to the present invention mounted on a snowmobile track.
Figure 4:
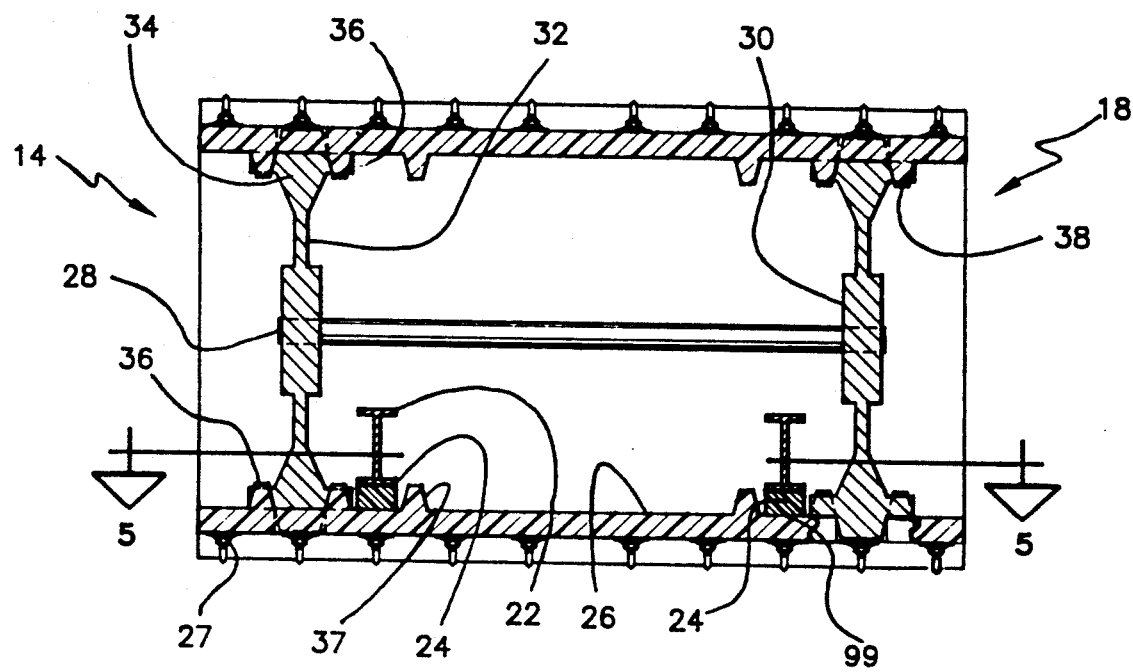
FIG. 4 is an enlarged sectional end view taken along the line 4—4 of FIG. 1.
Figure 5:
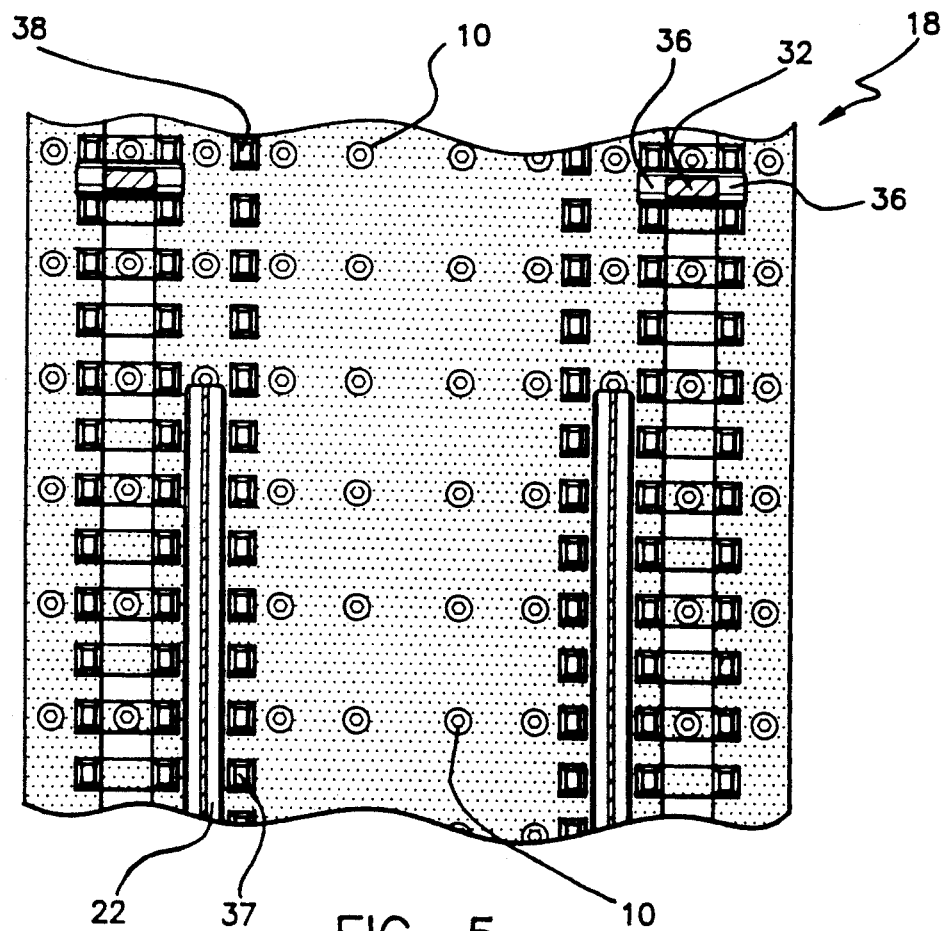
FIG. 5 is a sectional plan view, taken along the line 5—5 of FIG. 4 but illustrating only one of the plurality of studs mounted in the belt.

As illustrated in FIG. 3, the diameter d of the enlarged diameter end portion 58 and adjoining portion of the head 62 gradually increases in an axially inward direction. The outside surface of the enlarged shank end 58 and head 62 diverges radially outwardly in an axially inner direction as illustrated at 68a and merges with the concave axially inner surface portion 68b to provide a smooth, continuous arcuate surface as illustrated.

Apparatus, generally designated 74, is provided for securing the stud in the position illustrated in FIG. 3 and includes a plate washer, generally designated 80, having a perimetrically extending, radially outer terminal flange portion 82 and an axially recessed portion 85 forming a cavity or well 87 for receiving a portion 90 of the axially displaced resilient material which is displaced by the stud head 62. The cavity 87 is in axially confronting relation with the concave axially inner surface 68 of the head 62. The washer 80 includes an axial bore 81 therethrough receiving the stud shank portion 58. As illustrated, the diameter of flange portion 82 of washer 80 is substantially greater than the diameter of the stud head 62.

The distance 86 between the axially outermost portion 88 of the concave head surface 68 and the axially confronting surface 87 of washer portion 86 is substantially equal to the thickness 90 of the resilient track 18.

The distance 92 between the face 94 of flange 82 and the inside surface 87 of recessed washer portion 84 is equal to the distance 93 between the terminal end 95 of flange 66 and the axially outermost portion 97 of the convex surface 70.

A fastener nut 100 is threaded at 98 on the central, cylindrical shank portion 33 for detachably holding the parts in the position illustrated in FIG. 3. When the nut 100 is threaded onto the shank portion 33, it will force the head 62 to embed in the outer track surface as illustrated in FIG. 3.

When the head 62 is moved to the position illustrated in FIG. 3 under the force of threaded nut 100, the head 62 will force a portion 91 of the resilient material 18 axially outward in the direction of the arrow 102. Because of the cup shaped flange 66 and the concave inner surface 68, the axially moving material 91 surrounding the shank 42 will also be moved radially inwardly, in the direction of the arrow 104. The material 91, which extends axially along the outer surface of the stud 10, will stabilize the stud 10.

Since the radius R of curvature of the axially outer central, concave head surface 64 matches the contour of the wheel ring 34, the track will smoothly negotiate the wheels 14 and 16.

Because of the curvature of axially outer, concave surface 64, there is less binding and less friction between the wheels 14 and 16 and the stud 10 and therefore, the track moves freer and less energy is required to propel the snowmobile. Also, because the track engaging portion 64 of stud head 62 is curved, it will not tend to lift or push the track 18 away from the wheel ends 14 and 16 to unnecessarily add tension to the track to stretch the track.

The mounting head 62 also includes a hexagonal central recess 106 which is countersunk in the central recess 64 for receiving an L-end wrench (not shown) for holding the shank when the nut 100 is being threaded thereon to prevent turning movement thereon when the nut 100 is being turned thereon.

It should be noted that the axially outer surfaces 108 of the radially outermost terminal flange portions 110 and the axially innermost surface 112 of central recess 64 are axially inward of the intermediate portion 97. This curvature will cause the arcuate surface 72 to smoothly fall along the wheel surface 35 and minimize the noise and vibrations which would otherwise be introduced when the stud negotiates the wheels.

A lubricant dispenser, schematically designated 118, is illustrated for flooding lubricant, such as antifreeze, between the wheel surface 35 and the inside surface 26 of the track. The central stud recess 64 serves as a cavity for receipt of the lubricant 120 to longitudinally transfer the retained lubricant in the direction of the arrow 13 to the undersides of the nylon rails 24 and thus reduce the friction therebetween.

The lubricant carried by the recesses 64 will lubricate the mating surfaces 97 of head 62 and the undersides 99 of rails 24.

THE OPERATION

A plurality of studs 10 are mounted on the track 18 by inserting the shanks 42, having the carbide inserts 50 brazed therein, in the track openings 40. The washers 80 are slipped over the shanks 42 and the nuts 100 threaded thereon.

An L-end wrench is placed in the hex head nut receptacle 106 while the nut 100 is turned. As the nut 100 is turned, the stud head 62 will be drawn into the track to the position illustrated in FIG. 3 to radially outwardly displace the resilient track material 90 to the position illustrated in FIG. 3. The displaced material 90 will be received in the cavity 87 provided in the cavity 87 of the washer 80.

The installation is simple and does not require the use of a torque wrench. The nut is merely turned until the washer 80 "bottoms out" against the shoulder 60.

The track 18, with the studs 10 mounted as illustrated in FIG. 3, is then placed on the wheels 14 and 16 and the snowmobile operated to drive the front wheels 14 which engages the track lugs 38 to propel the track 18 in an endless path represented by the arrow 13.

As the stud heads 62 initially come into contact with the outer surface of the wheel ring 34, the axial end arcuate end surfaces 64 will engage the wheel surface 35 with rolling contact to suitably negotiate the wheel.

As the stud heads 62 contact the wheel surface 35, the contact will be between the intermediate portion 97 and the outer wheel surface 35. If the track 18 happens to sag and stretch, then the wheel will engage the surface 108 smoothly and would not engage with a sharp line contact as would be the case if the stud was planar.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A traction stud for mounting on a snowmobile belt or the like comprising:
   an elongate shank, having an elongate axis, for mounting in a snowmobile belt including
   an axially outer ground engageable terminal end, and
   an axially inner head mounting end;
   a head, integral with said axially inner end of said shank and extending transversely to said axis radially outwardly beyond said shank, including
   an annular, axially outwardly opening, belt receiving trough, radially outwardly of said shank,
   having radially spaced inner and outer, annular trough side walls which radially converge toward each other in an axially inward direction to provide an annularly extending, axially outer track receiving concave surface for engaging a snowmobile belt.

2. The stud set forth in claim 1 wherein said radially inner side wall flares radially outwardly in an axially inward direction and said radially outer trough side wall flares radially inwardly in an axially inward direction.

3. The stud set forth in claim 1 wherein said head includes an axially inner surface provided with an axially outwardly recessed central portion, through which said axis passes, forming a centrally located, inwardly opening cavity.

4. The combination set forth in claim 3 wherein said cavity includes an annular, axially outwardly converging side wall.

5. The stud set forth in claim 4 wherein all points of said cavity are equidistant from a predetermined point such that said concave surface has a predetermined radius of curvature.

6. The stud set forth in claim 5 wherein said head includes a concavo-convex, annular flange diposed radially outwardly of said central cavity.

7. The traction stud set forth in claim 1 including
retaining plate means having an aperture of predetermined diameter therethrough received by said shank;
one of said head and said shank including an integral shoulder stop radially outwardly of said aperture in said plate means for maintaining said retaining plate means in axially spaced relation with said concave surface.

8. The traction stud set forth in claim 7 wherein a portion of said shank between said ends is threaded;
and wherein said retaining plate means includes a portion threadedly received by said threaded portion of said shank.

9. In combination:
an endless snowmobile track including a resilient belt having inner and outer surfaces and at least one opening extending through said belt between said surfaces;
an integral, snowmobile traction stud including
an elongate shank having an elongate axis, including
an axially outer, ground engageable terminal end outwardly of said outer track surface and
an axially inner head mounting end received by said opening;
a head integral with said axially inner head mounting end extending, transversely to said axis, radially outwardly beyond said axially inner end of said shank including
annular, radially inner and outer axially curved belt receiving trough side walls which axially inwardly converge toward each other to provide an annularly extending, axially outwardly opening, track receiving concave surface for engaging said inner face of said resilient belt.

10. The combination set forth in claim 9 wherein said head includes an axially inner surface provided with a central, concave surface having a uniformly, smoothly curved, annular side wall which radially inwardly converges in an axially outer direction.

11. The combination set forth in claim 10 wherein all points of said concave surface are equidistant from a predetermined point such that said surface has a predetermined radius of curvature.

12. The combination set forth in claim 11 further including at least one wheel around which said track is trained for movement in an endless path; said wheel having an outer cylindrical surface having a predetermined radius equal to said radius of curvature.

13. The combination set forth in claim 9 wherein said head comprises an annular concavo-convex flange.

14. The combination set forth in claim 9 wherein said track is of a predetermined thickness; and wherein one of said head and said shank includes a radially outwardly projecting shoulder portion; the axial distance between said shoulder portion and the axially innermost portion of said concave surface being substantially equal to said predetermined thickness.

15. The combination set forth in claim 14 including plate means mounted on said shank and bearing against said shoulder, said plate means having a concave recess axially opposing said concave surface of said head.

16. The combination set forth in claim 9 including means detachably coupled to said shank for urging said concave surface into intimate contact with said inner track surface to axially outwardly, and radially inwardly, displace a portion of said track adjacent the outer annular side wall of said trough.

17. The combination set forth in claim 16 wherein said means detachably coupled to said shank includes retaining plate means having an aperture of predetermined diameter detachably received by said shank; one of said shank and said head including a shoulder stop axially inward and radially outward of said aperture for limiting movement of said retaining plate means toward said concave surface.

18. The combination set forth in claim 16 wherein said retaining plate means includes an axially inwardly opening concave well having a portion in axially confronting relation with said concave surface.

19. A snowmobile traction stud for mounting on an endless snowmobile track comprising:
an elongate shank, having an elongate axis, for extending through a snowmobile track including
an axially outer, ground engageable terminal end, and
an axially inner head mounting end;
a transverse head having a central portion integrally mounted on said head mounting end and an integral annular flange extending radially outwardly beyond said shank;
said flange having an axially outer surface for bearing against said track
said transverse head including an axially inner surface having a central cavity through which said axis passes;
said cavity including an annular, axially outwardly converging side wall.

20. The stud set forth in claim 19 wherein said concave surface has a predetermined radius of curvature, all points of said concave surface being equally distant from a predetermined point.

21. The stud set forth in claim 20 including a central axially outwardly extending, inwardly opening tool receiving, opening projecting axially outwardly relative to said concave surface.

22. The stud set forth in claim 20 wherein said transverse head includes a central hub integral with said mounting end and a convexo-concave mounting flange integral with said hub.

23. In combination,
an endless snowmobile track comprising resilient material and including inside and outside track surfaces; said track including at least one opening therethrough extending between said inside and outside track surfaces;
an integral snowmobile stud comprising
an elongate shank, having an elongate axis, including,
one head mounting end received by said opening,
a ground engageable opposite end positioned outwardly of said outside track surface, and
an intermediate portion of predetermined diameter between said ends adjacent said outside track surface;
a mounting head integral with, and extending transversely of, said head mounting end;
means detachably coupled to said intermediate portion adjacent said outside track surface for urging said head into intimate contact with said inside track surface to axially outwardly displace a portion of said track;
said mounting head including;
a central hub, through which said axis passes, having an outer annular surface which flares radially outwardly, relative to said intermediate portion, in an axially inward direction;

a perimetrically extending rim, integral with said hub, extending radially outwardly of said hub transverse to said axis adjacent said inside surface of said track;

said rim including an axially outer concave surface having a perimetrically extending border portion having a flush junction with said radially outwardly flaring annular surface;

said concave surface flaring radially outwardly in an axially outward direction for urging a portion of said resilient track portion adjacent thereto radially inwardly toward said hub.

24. A one-piece traction stud for mounting on an endless snowmobile belt or the like comprising:

an elongate shank, having an elongate axis, including
a ground engageable axially outer terminal end, and
a head mounting axially inner end;

a mounting head integral with and extending transversely of, said shank and including
a central hub, integral with said head mounting end, having an outer annular surface which flares radially outwardly relative to said head mounting end in an axially inward direction to provide a radially inner, annular surface;

a perimetrically extending rim, integral with said hub, extending radially outwardly of said hub transverse to said axis including
an axially outer concave surface having a perimetrically extending border portion having a flush junction with said radially outwardly flaring annular surface;

said concave surface flaring radially outwardly in an axially outward direction.

25. The stud set forth in claim 24 wherein said head includes an axially inner surface, having a central, generally circular, uniformly curved concave surface all points of which are equidistant from a predetermined point.

26. The stud set forth in claim 25 wherein said concave recessed portion is generally circular and all points of said recessed portion are equidistant from a predetermined point.

27. The stud set forth in claim 26 wherein said concave surface defines an annular, axially outwardly opening trough having axially inwardly converging sidewalls.

28. A traction stud for a snowmobile belt or the like comprising:

an elongate shank having an axis, including
an axially outer ground engageable terminal end, and
an axially inner head mounting end adapted to be received in a snowmobile belt;

a head, integral with said inner end of said shank, extending transversely to said axis radially outwardly beyond said shank including
an annular, axially outwardly opening trough radially outwardly of said shank;

retaining plate means having an aperture therethrough detachably receiving said shank;
one of said shank and said head including a stop axially outward of said concave surface and radially outwardly of said aperture for maintaining said retaining plate means a predetermined minimum axial distance away from said concave surface.

29. The stud set forth in claim 28 wherein said shank includes a threaded portion and said retaining plate means includes means threadedly receive on said threaded portion of said shank for selectively moving said plate means toward said head into abutting relation with said stop.

30. The stud set forth in claim 29 wherein said retaining plate means includes a central, axially inwardly opening, concave well axially opposing said trough.

31. The stud set forth in claim 30 wherein said annular trough includes radially inner and outer, axially inwardly converging side walls.

32. In combination:
an endless snowmobile track, of predetermined thickness, having inner and outer surfaces and at least one opening extending between said inner and outer surfaces;

a snowmobile stud including
an elongate shank, having a longitudinal axis, including a ground engageable axially outer end portion, an intermediate portion, of predetermined radial breadth and a head mounting portion having a greater predetermined radial breadth integrally joined to said intermediate portion to provide an annular shoulder;

a transversely extending head, integral with said head mounting portion, including an axially inner end surface and a radially outwardly extending mounting flange having an axially outer surface for bearing against said track;
the axial distance between said axially outer surface of said head and said shoulder being substantially equal to said thickness of said track;

plate means received by said shank and bearing against said shoulder; and coupling means detachably adjustably mounted on said shank for urging said plate means and said head toward each other.

33. In combination:
a snowmobile drive system including
a pair of rotatable wheels, at least one of said wheels having a predetermined radius;
an endless snowmobile track trained around the wheels for movement in an endless path of travel, said track including an opening therethrough
a snowmobile stud comprising
a shank, having a longitudinal axis, received in said opening, including a terminal, ground engageable end and an opposite end;
a mounting head, integral with said opposite end and extending transversely to said axis, including an axially outer surface bearing against one side of said track and an axially inner surface; and
means detachably mounted on said shank on the opposite side of said track for detachably urging said head toward said one side of said track;
said axially inner surface of said mounting head including a central concave, recessed portion having a uniformly curved concave surface with a radius of curvature substantially equal to said radius of said one wheel.

34. The combination set forth in claim 33 wherein all points of said concave surface are equidistant from a predetermined point.

35. A stud for snowmobiles and the like including:
an elongate shank having a longitudinal axis and including an axially outer terminal end and an axially inner head mounting end; and
a mounting head, integral with an axially inner end of said shank, extending transversely to said axis;

said head including
a central portion, and
a generally concavo-convex, radially outer flange integral with and extending perimetrically about said central portion defining a perimetrically extending, axially outwardly opening trough.

36. The stud set forth in claim 35 wherein said central portion includes a central, axially outer surface having an axially inwardly disposed recessed portion forming a central cavity.

37. The stud set forth in claim 35 including fastener means threadedly mounted on said shank.

38. In combination with a snowmobile drive system including:
 a pair of spaced apart wheels of predetermined radius;
 an endless track of resilient material trained around the wheels for movement in an endless path of travel, said track including an inside and outside surface;
 a plurality of spaced apart apertures through said track extending between said inside and outside surfaces;
 a plurality of studs mounted on said track, each stud including
 a shank, received by one of said apertures, including a ground engageable end axially outward of said outside surface of said track and an opposite end;
 a mounting head, integral with said opposite end of said shank on said inside surface of said track and including
 a central portion and
 a concavo-convex flange perimetrically extending about said central portion defining a perimetrically extending, axially outwardly opening tough for receiving and axially displacing and radially compressing a portion of said track;
 means threadedly coupled to said shank on said one side of said track for detachably clamping said head to said inside surface of said track.

39. The combination set forth in claim 38 wherein said central portion includes an axially outer central curved surface which is axially inwardly recessed relative to a portion of said flange.

40. The combination set forth in claim 39 wherein said central surface has a radius of curvature equal to said radius of at least one of said wheels;
 said flange including means for radially inwardly displacing a portion of said resilient material surrounding said opening radially inwardly toward said shank.

* * * * *